United States Patent [19]
Nishizawa

[11] Patent Number: 5,878,294
[45] Date of Patent: *Mar. 2, 1999

[54] INSERTABLE MAGNETIC HEAD ASSEMBLY FOR FILM CAMERA

[75] Inventor: Akio Nishizawa, Kanagawa-ken, Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 655,802

[22] Filed: May 31, 1996

[30] Foreign Application Priority Data

May 31, 1995 [JP] Japan .................................... 7-133904

[51] Int. Cl.$^6$ ................................................. G03B 17/24
[52] U.S. Cl. ............................................................. 396/320
[58] Field of Search .................................... 396/310, 319, 396/320; 360/104, 130.3, 130.32

[56] References Cited

U.S. PATENT DOCUMENTS

| | | | |
|---|---|---|---|
| 5,005,031 | 4/1991 | Kelbe | 396/320 |
| 5,097,278 | 3/1992 | Tamamura et al. | 396/320 |
| 5,477,290 | 12/1995 | Takeshita | 396/319 |

FOREIGN PATENT DOCUMENTS

| | | |
|---|---|---|
| A-4-289843 | 10/1992 | Japan . |
| A-4-293038 | 10/1992 | Japan . |
| 6-118501 | 4/1994 | Japan . |

*Primary Examiner*—Howard B. Blankenship
*Attorney, Agent, or Firm*—Oliff & Berridge, PLC

[57] ABSTRACT

In a preferred embodiment, a camera has a magnetic head and a pad that is replaceable without removing additional pieces of the device. The device includes film path forming members that form a film path where the film moves in a horizontal direction, a magnetic head that records data in magnetic recording areas on the film surface and/or reads data from the magnetic recording areas and a pad adjacent and facing the magnetic head across the film path. The pad presses the magnetic recording areas of the film against the magnetic head. A holding mechanism holds either the magnetic head or the pad, which is forced by an elastic body to the other of the magnetic head and the pad. The holding mechanism has an insertion unit to hold either the forced magnetic head or the forced pad. The pad can be inserted from the film path into the insertion unit. The holding mechanism further has a receiver that receives an end of the elastic body. The device can further have a hook that hooks on a part of the holding mechanism such that the forced magnetic head or pad is not unintentionally removed from the insertion unit by the force from the elastic body.

27 Claims, 9 Drawing Sheets

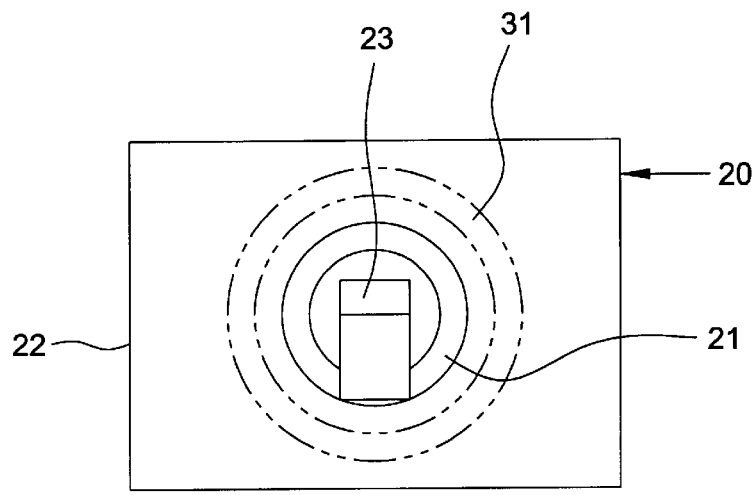
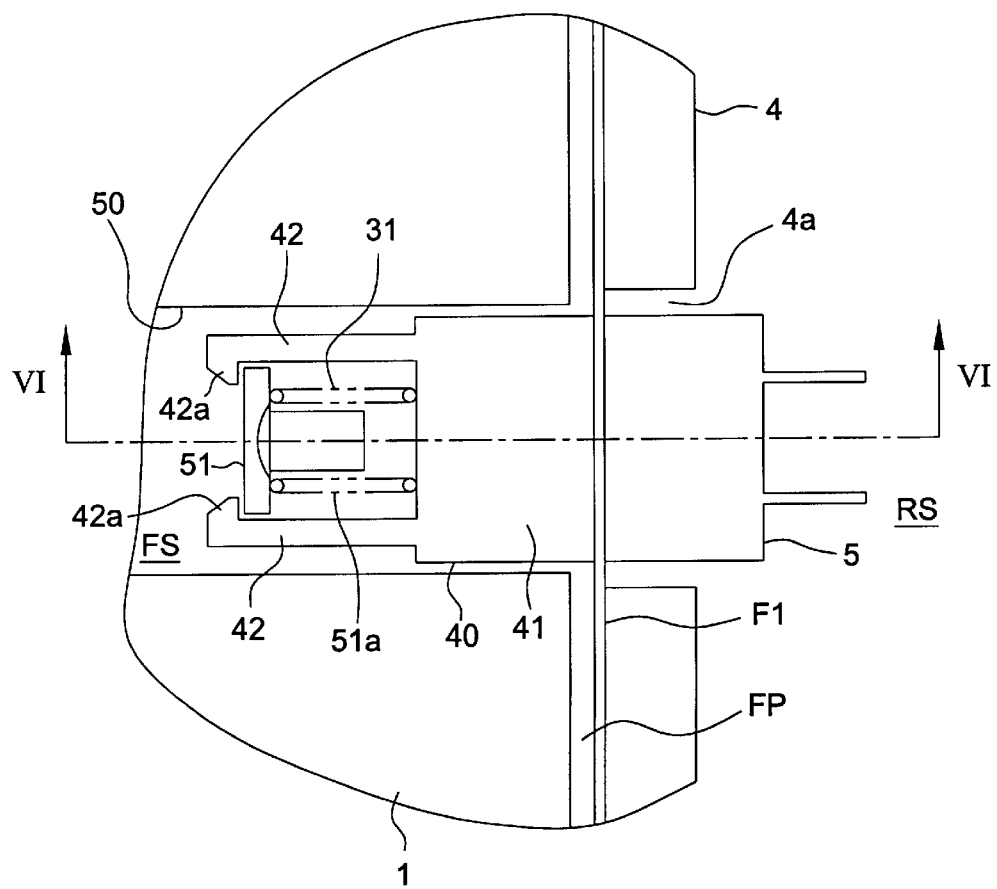

INSERTABLE MAGNETIC HEAD ASSEMBLY FOR FILM CAMERA

BACKGROUND OF THE INVENTION

1. Field of the Invention

The present invention relates to an apparatus that records data onto a film and reads data from the film using a magnetic head.

2. Description of Related Art

A camera that records data in a magnetic layer on a film using a magnetic head requires a pad at a position facing the magnetic head interposed by the film. The camera then pushes either the magnetic head or the pad to the other to press the film between the magnetic head and the pad. A conventional camera having this type of magnetic head and pad is disclosed in Japanese Laid-Open Patent Publication Hei 4-289843 and Japanese Laid-Open Patent Publication Hei 4-293038. With these cameras, the film is fed along a film path inside the camera. Among two opposing spaces along the film path, the magnetic head is positioned in a space on a rear side, and the pad is positioned in a space on a front side. Further, the pad attaches by insertion from the front side of the camera into an insertion hole of the camera body.

In general, there is much various equipment included in the space on the front side of the camera, such as the shooting lens barrel and the like. Because of this, a camera structure where the pad is inserted from the front side of the camera and fixed to a position close to the back of the camera permits limited freedom in the mounting order the camera equipment. Further, there is the problem that equipment has to be removed when changing the pad, for example. On the other hand, if there is freedom in the mounting order the pad, the equipment in the space on the front side has some restrictions.

SUMMARY OF THE INVENTION

The object of the present invention is to provide an apparatus having a magnetic head that can mount a pad without affecting the equipment inside the apparatus.

Another object of the present invention is to provide an apparatus having a magnetic head having freedom in the mounting order of the magnetic head.

The present invention can be applied to a device having film path forming members that form a film path where the film moves in a horizontal direction, for example. The device also has a magnetic head that records data in magnetic recording areas on the film surface and/or reads data from the magnetic recording areas. A pad in the device is positioned adjacent and facing the magnetic head across the film path. The pad presses the magnetic recording areas of the film against the magnetic head. The device also has an elastic body that forces either the magnetic head or the pad to the other. The device solves at least the problems described above using the following construction.

A holding mechanism that holds a selected member that is either the magnetic head or the pad is forced by the elastic body to the other of the magnetic head and the pad. The holding mechanism has an insertion unit to hold the selected member. The selected member is inserted from the film path into the insertion unit. The holding mechanism further has a receiver that receives an end of the elastic body.

The device can further have an engagement member on the selected member that engages a part of the holding mechanism such that the selected member is not unintentionally removed from the insertion unit by the force from the elastic body.

The device can further have a sliding part in the selected member that can slidingly reciprocate in the insertion unit in a direction of the force from the elastic body.

The selected member can be the pad and include a film touching part, the engagement member and the sliding part, which are integrally formed together as one piece with synthetic resin. Further, the size of the film touching part, the engagement member and the sliding part of the integral selected member are configured so that when they are projected onto the film surface, projected areas of the engagement member and the sliding part are included within the projected area of the film touching part.

Alternatively, the engagement member can be composed as a concave part and a protrusion on the holding member. The protrusion elastically deforms and rebounds to engage the concave part when the selected member is inserted into the insertion unit. The deformable protrusion can be exposed in the film path.

The engagement member can further be composed to engage the periphery of a hole formed on the holding member by being inserted into and rotated in the hole.

Other objects, advantages and salient features of the invention will become apparent from the detailed description taken in conjunction with the annexed drawings, which illustrate preferred embodiments of the invention.

BRIEF DESCRIPTION OF THE DRAWINGS

The invention will be described with reference to the following drawings in which like reference numerals refer to like elements and wherein:

FIG. 4 is a diagram showing a front side view of a pad in FIG. 3;

FIG. 5 is a diagram showing a flat cross-sectional view of a camera according to another embodiment of the present invention;

DETAILED DESCRIPTION OF PREFERRED EMBODIMENTS

A first embodiment of the present invention is described with reference to FIGS. 1–4. As shown in FIG. 2, a cover 2 covers a camera body 1. A shooting lens barrel 3 is positioned at the front part of the camera body 1. A pressure plate 4 is positioned at the rear of the camera body 1.

Figure 1:
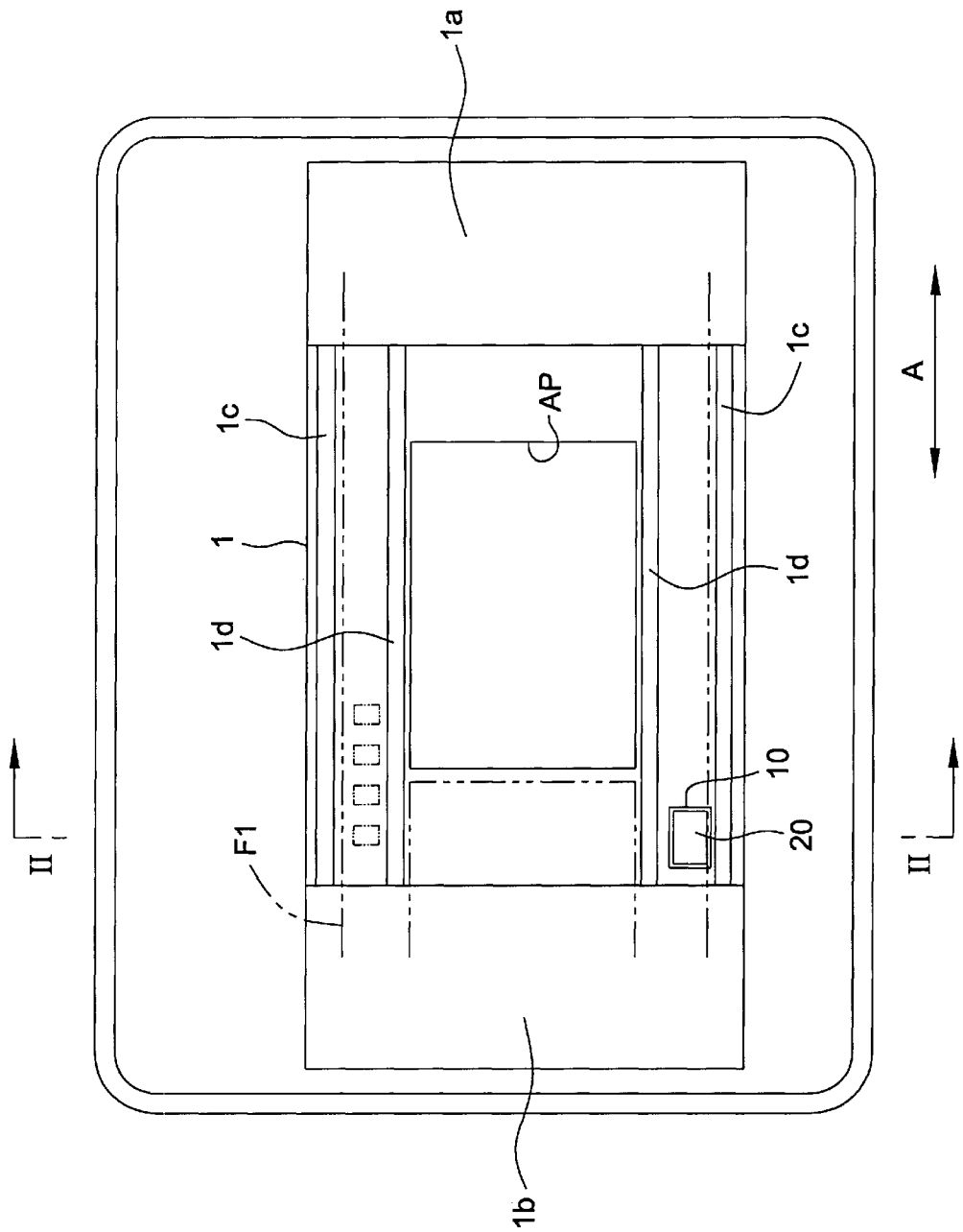
FIG. 1 is a diagram showing a rear side cross-sectional view of a camera according to one embodiment of the present invention.
Figure 2:
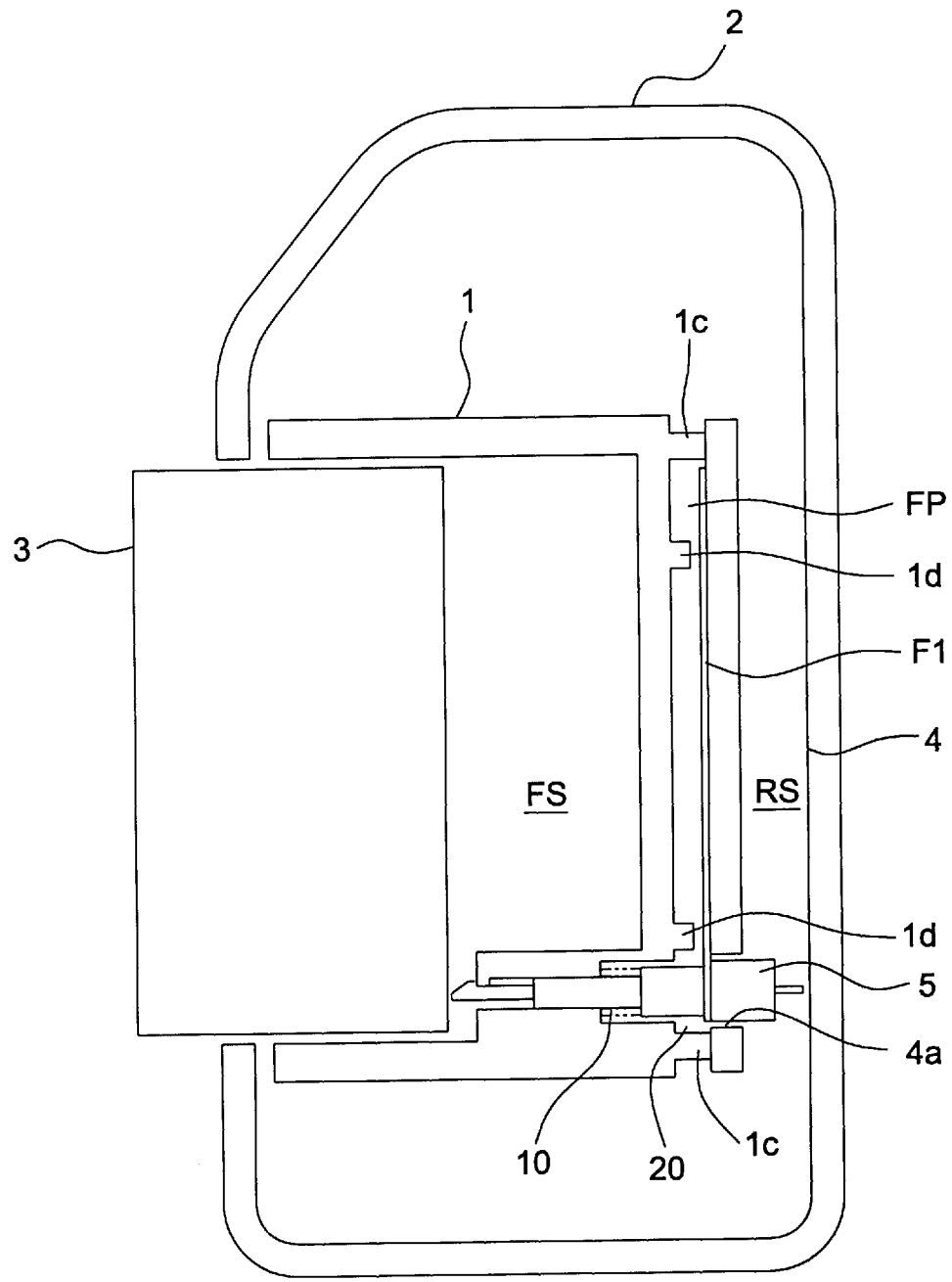
FIG. 2 is a diagram showing a cross-sectional view along the II—II line in FIG. 1.

As shown in FIG. 1, in the camera body 1, a cartridge chamber 1a where a film cartridge can be loaded is at one end. A spool chamber 1b where a film rolling spool can be stored at the other end. Between the cartridge chamber 1a and the spool chamber 1b, an aperture AP is formed. On the back surface of the camera body 1, there is an outside rail protrudingly provided, which is an upper rail and a lower rail pair 1c. A pair of inside rails 1d are formed above and below the aperture AP between the outside rails 1c.

A film path FP is formed between the camera body 1 and the pressure plate 4. A film FI is fed in the A direction as indicated in FIG. 1. The film FI is fed in the direction perpendicular to the surface of the diagram shown in FIG. 2. A magnetic head 5 is inserted and fixed using a through hole 4a formed at the lower part of the pressure plate 4. The magnetic head 5 is positioned in a rear space RS, which is further to the rear of the camera than the film path FP and is surrounded by the cover 2. Data, such as a date of photography and exposure values, can be recorded in a magnetic layer extendedly provided in a lower part and back part of the film FI away from the magnetic head 5.

Figure 3:
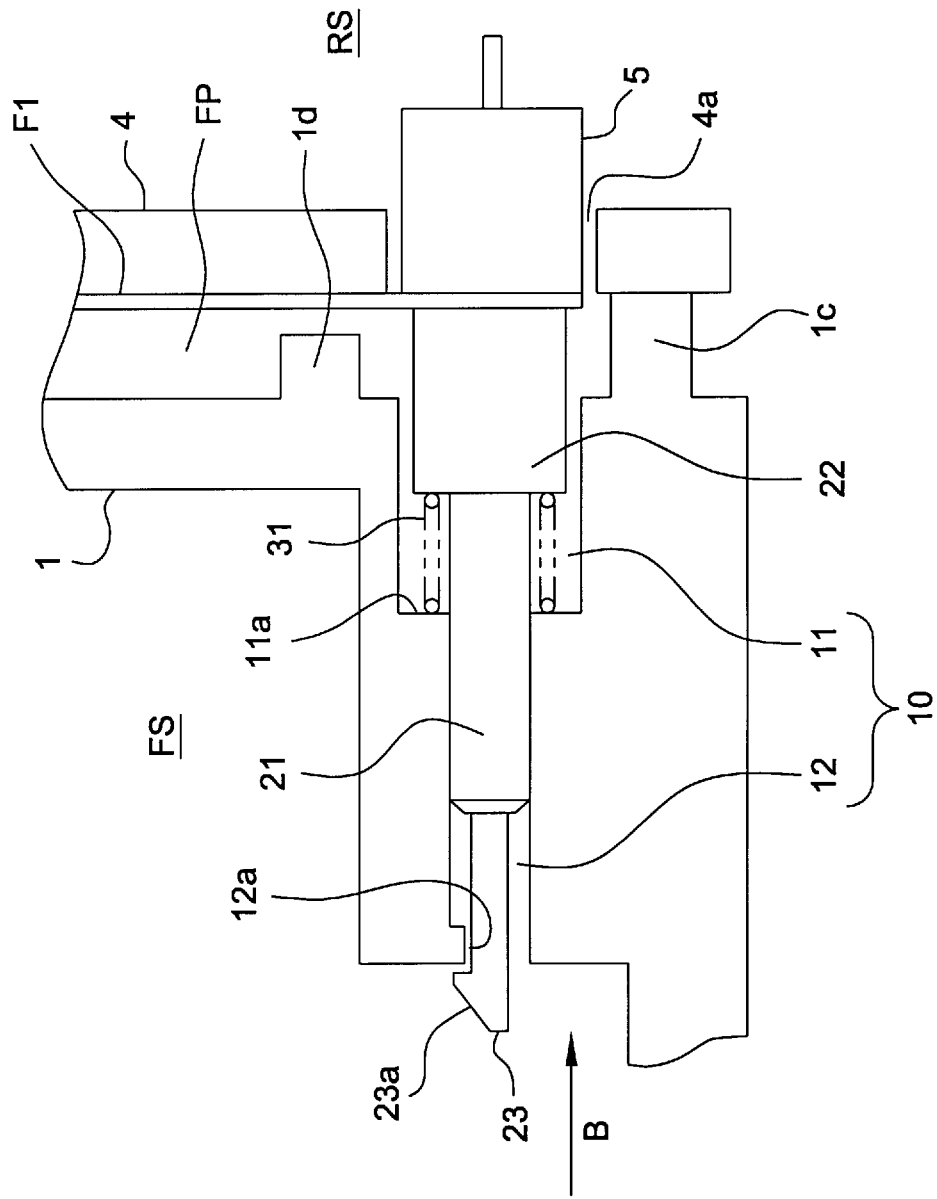
FIG. 3 is a diagram showing an enlarged view of items in FIG. 2.

Between the lower outside rail 1c and the lower inside rail 1d in the camera body 1, a pad insertion hole 10 is formed toward the side of the spool chamber 1b where a pad 20 is mounted to face the magnetic head 5. As shown in FIG. 3, the pad insertion hole 10 is positioned in a front space FS in the camera that includes the front side of the film path FP. The pad insertion hole 10 includes a large diameter part 11 opening on the back side of the camera and a small diameter part 12 opening on the front side of the camera. A camera front side wall in the large diameter part 11 is a spring receiving part 11a where an end of a compression spring 31 is held.

The pad 20, a sliding part 21, a pad body 22 on the side of an end of the sliding part 21 and key-shaped hook 23 on the other end of the sliding part 21 can be formed as one piece using synthetic resin. The compression spring 31 can be inserted over the sliding part 21. The diameter of the sliding part 21 is made a little smaller than the diameter of the small diameter part 12 in the pad insertion hole 10, to allow sliding in the forward and backward direction of the camera by the small diameter part 12.

As shown in FIG. 4, on the pad 20 in the first embodiment, the diameters of the sliding part 21 and the hook 23 are smaller than the inner diameter of the compression spring 31, and the outer diameter of the compression spring 31 is smaller than the dimensions extending up and down, and extending left and right of the pad body 22. In other words, the sizes of each part 21–23 are configured so that the projected areas of the sliding part 21 and the hook 23 are included within the projected area of the film contacting surface when the film contacting surface, the sliding part 21, and the hook 23 of the pad body 22 are projected onto the film surface. Further, the dimensions extending up and down, and left and right of the pad insertion hole 10 are measured to be large enough to store the pad body 22 and do not require the upper and lower rails 1c and 1d to be (shaved) in order to form the pad insertion hole 10.

The pad 20 is inserted from the back side of the camera, that is, from the film path FP side into the insertion hole 10 before mounting the pressure plate 4. The hook 23 and the sliding part 21 are first when the pad 20 enters the pad insertion hole 10 where the sliding part 21 slides in the small diameter part 12. The hook 23 is temporarily elastically bent by a slope 23a formed on the hook 23 when the hook 23 slides over a protrusion 12a protruding at the opening of the small diameter part 12. Thus, the hook 23 protruding on the front side of the camera is hooked at the peripheral of the small diameter part of the camera body 1. At this time, the rear end of the pad body 22 is located in the large diameter part 11. The top of the pad body 22 protrudes from the large diameter part toward the back side of the camera. The compression spring 31 is held between the spring receiving part 11a and the pad body 22 in the large diameter part 11. The pad 20 is forcibly applied to the film path FP side by the force from the compression spring 31. However, the pad 20 never comes out of the insertion hole 10 because of the engagement between the hook 23 and the camera body 1. When the pressure plate 4 housing the magnetic head 5 is mounted, the magnetic head 5 presses to the pad body 22.

In the first embodiment, the pad 20 is forced by the compression spring 31 to insert from the film path FP side. That is, the pad 20 inserts from the rear space RS side to the pad insertion hole 10 and is held. Much various camera equipment/devices, such as the shooting lens barrel 3 and the like, are stored in the front space FS. On the other hand, almost no devices are stored in the rear space RS. Moreover, because adjustments of the back focus are required during the camera assembly, the aperture on the back of the camera is exposed until a substantial amount of the camera is complete. If the pad 20 is mounted from the rear space RS side as described in the first embodiment, mounting the pad 20 immediately before closing the aperture is possible and desirable. Thus, mounting the pad 20 is as convenient as the case of mounting the pad from the front side.

When removing the pad 20, the pad 20 should be pulled towards the rear side of the camera after releasing the engagement between the hook 23 and the body 1 at the front side of the camera.

In the camera structured as described above, the film FI pulled from the film cartridge loaded in the cartridge chamber 1a feeds in the A direction as indicated in FIG. 1. The film FI travels the film path FP between the camera body 1 and the pressure plate 4, past the aperture AP, and then winds onto the film rolling spool in the spool chamber 1b. At that time, the movement of the film FI in the vertical direction is restricted by the upper and lower outside rails 1c. The movement of the film FI in horizontal direction is restricted by the upper and lower inside rails 1d and the pressure plate 4. The magnetic layer provided on the bottom of the film FI is pushed against the magnetic head 5 by the pad body 22, which is forced by the compression spring 31 while the pad 20 is held by the hook 23. Then, photographic information is recorded in the magnetic layer by the magnetic head 5 while advancing one frame after shooting.

With the structure of the embodiment described above, the camera body 1, the pressure plate 4, the compression spring 31 and the pad insertion hole 10 compose a film path forming member, an elastic body and an insertion part, respectively.

Figure 6:
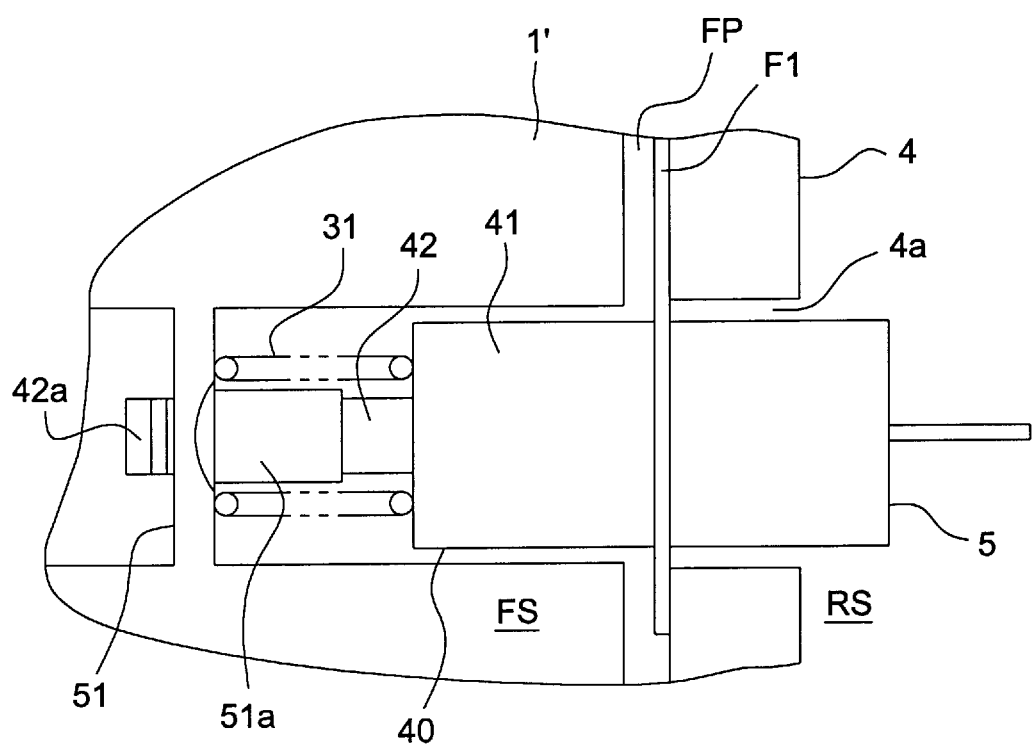
FIG. 6 is a diagram showing a cross-sectional view along the VI—VI line in FIG. 5.

A second embodiment of the present invention is described with reference to FIGS. 5–6. As shown in FIG. 5, inside a pad insertion hole 50 formed in a camera body 1', an engagement component 51 with a protruding spring external insertion originating component 51a is provided. A compression spring 31 is inserted over the spring external insertion originating component 51a.

The pad 40 includes a pad body 41 and a pair of hooks 42, which includes a right hook and a left hook. The pad 40 can be held together with synthetic resin or integrally formed of synthetic resin. The pad 40 is inserted into a pad insertion hole 50 from the rear side of the camera, that is the film path FP side. A slope 42a at the top of each of the pair of the hooks 42 slides over the engagement component 51 and results in the hooks 42 being temporarily deformed away and then springing back to be engaged onto the engagement component 51. The compression spring 31 is externally inserted to the spring external insertion originating component 51a to be held between the pad body 41 and the engagement component 51. The pad 40 is forced to the film path FP side by the compression spring 31 or the like.

Since the compression spring 31 is externally inserted (socketed) into the spring external insertion originating component 51a, the compression spring 31 position does not move. As shown in FIG. 6, the same result can be obtained by providing a cylinder-shaped spring internal inserting protrusion to insert and maintain an end of the compression spring 31 in the protrusion instead of the spring external insertion originating component 51a.

Removing the pad 40 can be performed by releasing the engagement between the pair of hooks 42 and the protruded engagement component 51 from the front side of the camera. Then, the pad 40 is removed from the rear side of the camera.

A third embodiment of the present invention is described with reference to FIG. 7. A spring external insertion originating component 101a is protrudingly provided on the bottom of a pad insertion hole 60 formed in a camera body 101. The compression spring 31 is inserted over the spring insertion originating component 101a. A plurality of concave parts 71 is formed on with at least one on opposing sides of a pad 70. Engaging protrusions 101b that engage with each of the concave parts 71 are formed on the camera body 101.

When the pad 70 is inserted into the insertion hole 60, a slope 72 of the pad 70 and a slope 101c of the protrusions 101b elastically contact. Thus, the protrusions 101b are elastically bent. If the pad 70 is further inserted, the protrusions 101b elastically recover and engage with the concave parts 71. At that time, the compression spring 31 is held between the pad 70 and the bottom of the insertion hole 60, which results in the pad 70 being forced to the film path FP side.

Figure 7:
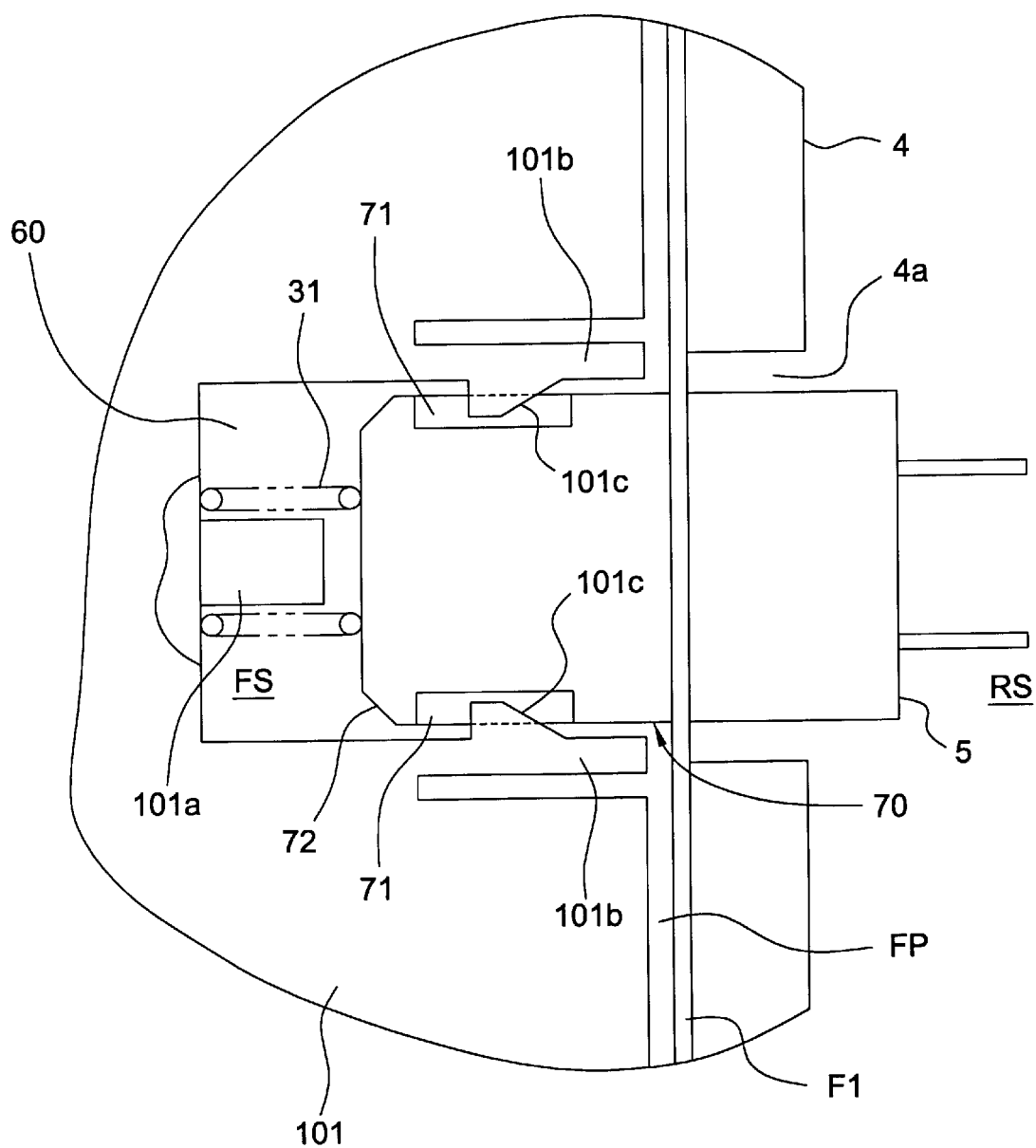
FIG. 7 is a diagram showing a flat cross-sectional view of a camera according to yet another embodiment of the present invention.
Figure 8:
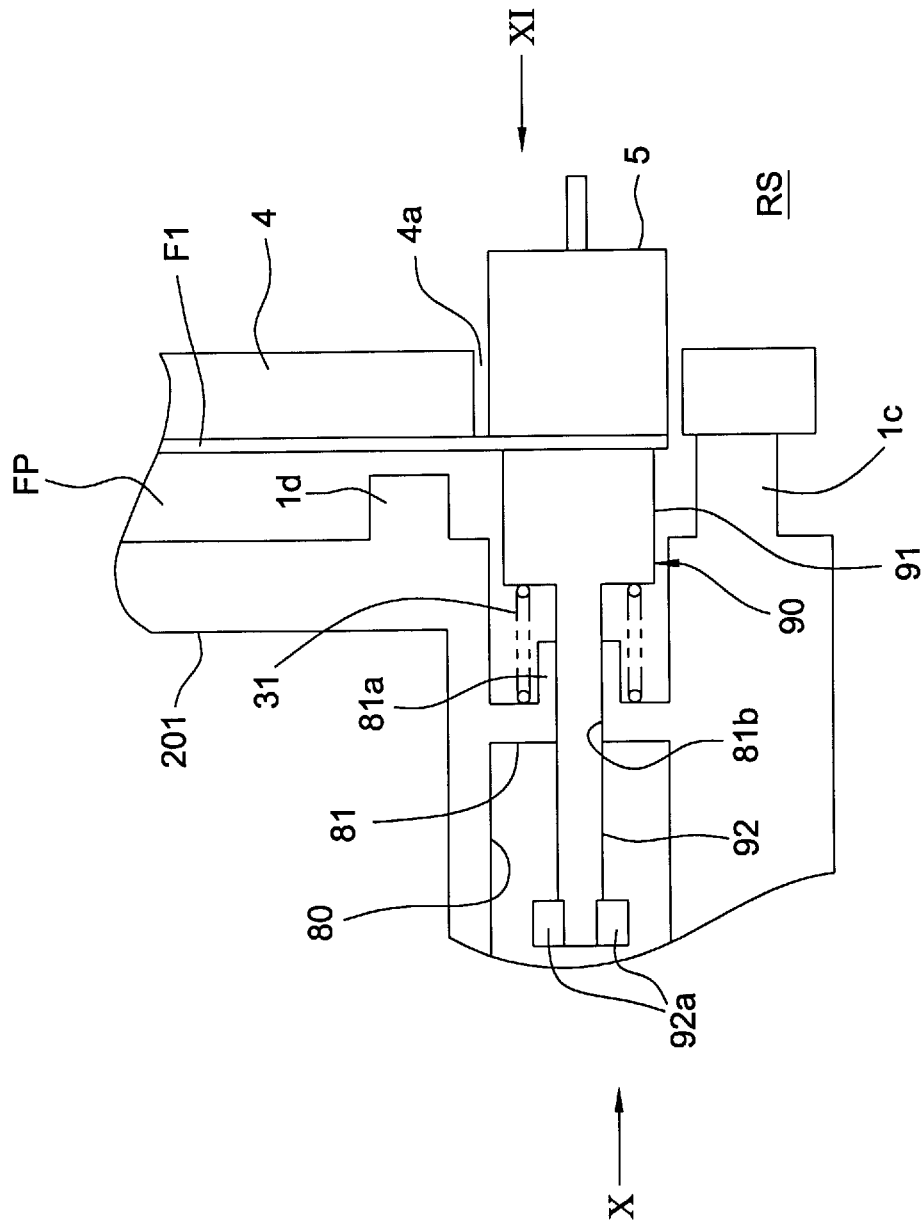
FIG. 8 is a diagram showing a flat cross-sectional view of a camera according to still yet another embodiment of the present invention.
Figure 9:
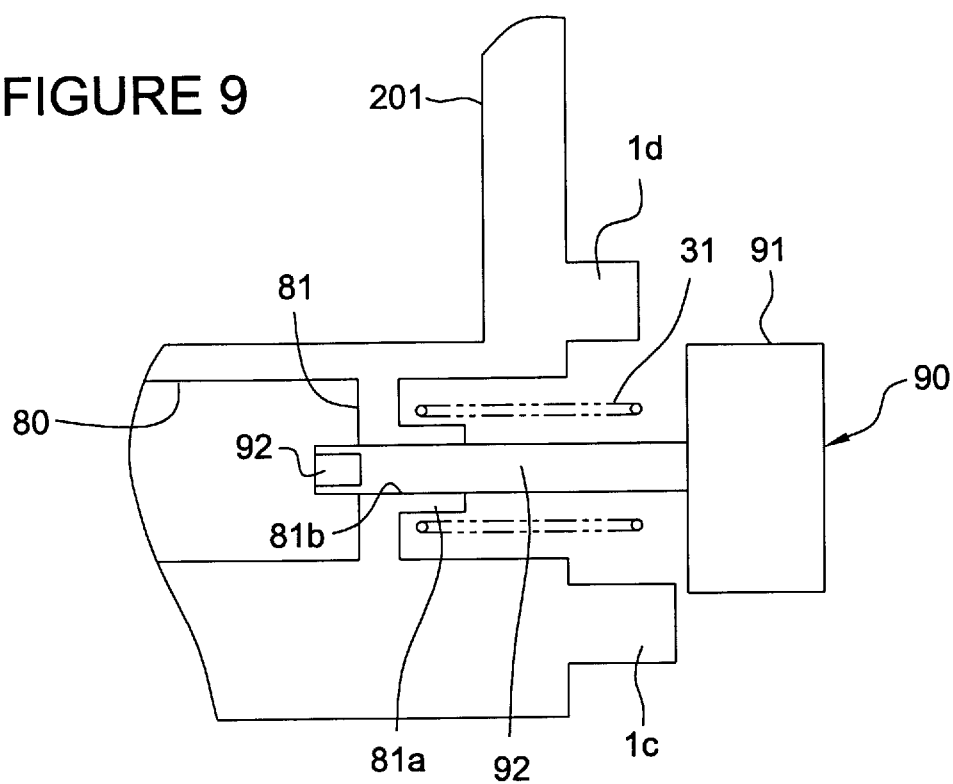
FIG. 9 is a diagram showing a process of insertion of a pad.

As shown in FIG. 7, a part of the engaging protrusion 101b is exposed in the film path FP. The pad 70 can be removed by bending the protrusion 101b exposed in the film path FP from the film path FP side to release the engagement between each of the protrusions 101b and the corresponding concave part 71. Therefore, no additional work from the front side of the camera is required to mount the pad 70 and to remove the pad 70. Thus, other devices provided in the front space FS do not have to be removed for changing the pad 70.

A fourth embodiment of the present invention is described with reference to FIGS. 8–11. A diaphragm 81 having a protrusion 81a is provided on a pad insertion hole 80 formed on a camera body 201. A through hole 81b having a shape shown in FIG. 11 is formed on the diaphragm 81. A pad 90 includes a pad body 91 and a sliding part 92 can be formed together with synthetic resin. A top (hook part) of the sliding part 92 is made to have the same shape as the through hole 81 by providing a pair of protrusions 92a, as shown in FIG. 10.

In assembling the camera, after the compression spring 31 is externally inserted into the protrusion 81a on the diaphragm 81, the pad 90 is inserted into the insertion hole 80 from the film path FP side. In so doing, the top of the sliding part 92 is inserted into the through hole 81b on the diaphragm 81 by appropriately rotating the pad 90. The pad 90 is inserted by sliding the sliding part 92 inside the through hole 81b. Then, the pad is rotated 90 degrees when the top of the sliding part 92 protrudes out beyond the through hole 81b. If the pad 90 is pushed further, the force from the compression spring 31 is held between the pad body 91 and the diaphragm 81 forces the pad 90 onto the film path FP side. By rotating the pad 90, for example by ninety degrees (90°), when the pad 90 is moved towards the film path FP side by the force from the compression spring 31, the extending part 92a of the top of the sliding part 92 is hooked onto the periphery of the opening of the pad insertion hole 80. Therefore, the pad 90 is not pulled out of the pad insertion hole 80 by the force of the compression spring 31. When the pressure plate 4 containing the magnetic head 5 is subsequently mounted, the pad 90 is pushed by the magnetic head 5 and is held in the position shown in FIG. 8.

Figure 10:
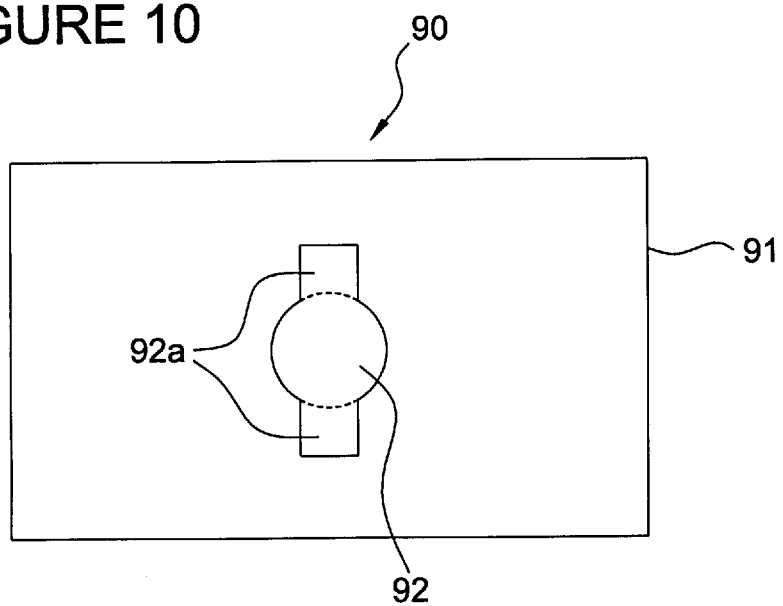
FIG. 10 is a diagram showing a view of the pad looking from the direction indicated by the X in FIG. 8.
Figure 11:
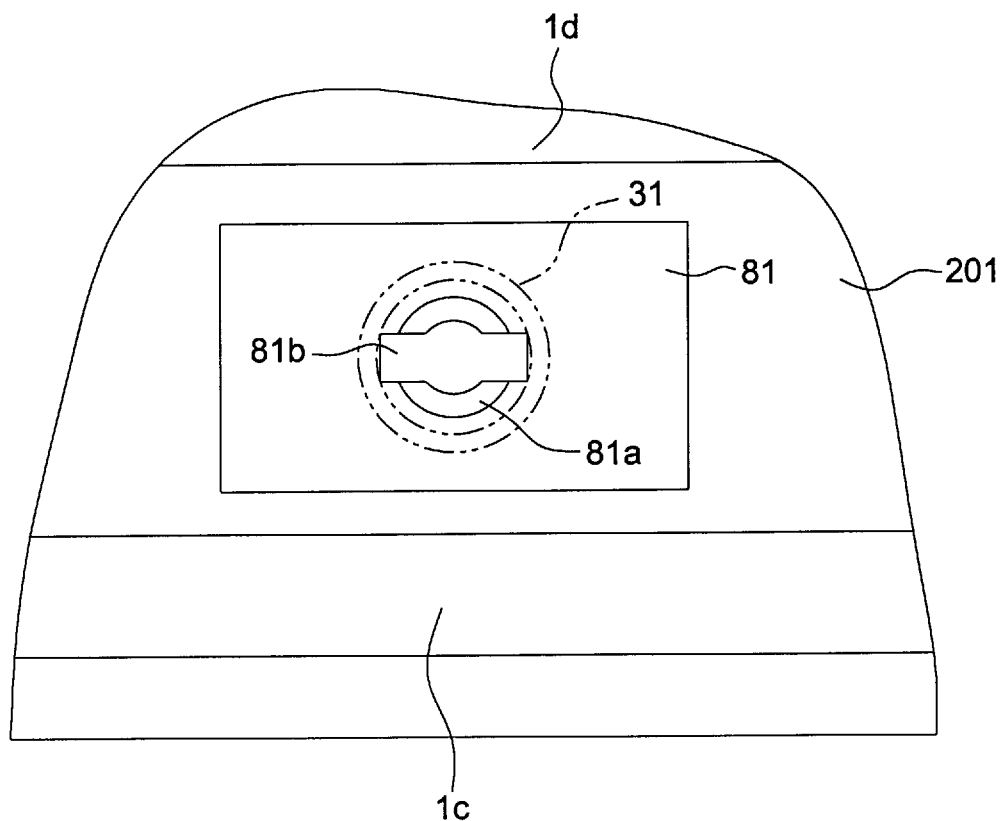
FIG. 11 is a diagram showing a view of the pad insertion part looking from the direction indicated by the XI in FIG. 8.

As shown in FIG. 10, a diameter including the extending part 92a of the pad sliding part 92 is smaller than the dimensions extending from the top and bottom, and extending left and right of the pad body 91. That is, the projected area of the sliding part 92 is included within the projected area of the film contacting surface of the pad body 91 when the film contacting surface and the sliding part 92 on the pad body 91 are projected onto the film surface. Further, the dimensions extending from the top and bottom, left and right of the pad insertion hole 80 are required to have a measurement sufficient to store the pad body 91. Thus, shaving the upper and lower rails 1c and 1d or the like is not required to form the pad insertion hole 80.

In the fourth embodiment described above, an example is given where a hook is provided on the pad 90 to prevent the pad 90 from coming out the film path side. However, the hook does not have to exist. In that case, the pressure plate 4 is positioned during assembly while holding the pad 90 so that the pad 90 does not come out.

As would be apparent to one of ordinary skill in the art, the present invention is not limited to a camera. The present invention could be another device having a magnetic head that records information onto film and/or reads the information from the film, such as a stretching device or projecting device, or a device that only records the information.

Further, as opposed to the above description, a camera can have the magnetic head and the pad positioned in the front space FS and the rear space RS, respectively. A holding mechanism is then provided having a corresponding insertion where the magnetic head is inserted from the film path side and held. A receiving part is then provided that receives an end of a spring that holds the magnetic head to the film path side. Moreover, the magnetic head can be record-only or read-only, or can be both.

According to the present invention, the member among the magnetic head and the pad that is forced by the elastic body is inserted to be held in the holding mechanism from the film path side is hereafter the selected member. Further, an end of the elastic body forcing on the side of the other member is held at a receiving part of the holding mechanism. Therefore, the mounting order of the magnetic head and the pad is made to be convenient. Moreover, the mounting of the magnetic head and the pad can be performed without effecting other devices or equipment assembled in the camera. Thus, no other devices are required to be removed when replacing parts of the magnetic head and the pad, for example.

A hook can prevent the selected member forced by the elastic body from being forced out of the insertion hole into the film path. Further, the selected member is prevented without manually holding the selected member inserted into the holding mechanism at the time of assembly, which improves the efficiency of the assembling operation. If a sliding part that slides inside the holding mechanism is provided on the selected member forced by the elastic body, then the selected member can be inserted with an easily determined position in the holding mechanism.

If the film contacting part, the hook, and the sliding part of the selected member are formed together with synthetic resin, the number of parts and the cost can be reduced. If the projected areas for the hook and the sliding part are included within the projected area for the film contacting part when the film contacting part, the hook and the sliding part of the selected member are projected onto the film surface, the insertion part in the holding mechanism can be made small enough to not affect the surrounding parts.

If a concave part is provided on the selected member where the protrusion on the holding mechanism is elastically bent back and then releasingly hooked when the selected member is inserted into the holding mechanism, mounting the magnetic head and the pad can be executed easily. Especially if the deformable protrusion of the holding mechanism is exposed to the film path. Then, the selected member can be removed from the film path without executing any additional operations, which improves the efficiency of the replacement operation of the magnetic head and the pad.

If the hook of the selected member forced by the elastic body is engaged to the periphery of an aperture of the holding mechanism by being inserted and rotated, both preventing the selected member from inadvertently coming out under the force of the elastic body and intended removal can be easily executed.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An apparatus having a magnetic head comprising:
   a housing having a film path formed within the housing so that a film moves in a lengthwise direction of the film, the film path dividing the housing into a rear side and a front side;
   a magnetic head adjacent the film path that performs one of at least recording data in a magnetic recording area on the film and reading data from the magnetic recording area on the film;
   a pad facing the magnetic head across the film path, the pad urging the magnetic recording area toward the magnetic head;
   an elastic body forcing one member of the magnetic head and the pad toward the other member of the magnetic head and the pad, the one member being a forced member and the other member being a non-forced member; and
   a holding mechanism that holds the forced member adjacent the film path against a force of the elastic body, the holding mechanism comprising,
      an insertion part adjacent the film path for receiving the forced member such that the forced member is insertable from the rear side to be held by the holding mechanism, and
      a receiving part that receives an end of the elastic body, wherein the forced member includes a deformable engagement mechanism for engaging a part of the holding mechanism so that the forced member is retained within the insertion part against the force from the elastic body.

2. The apparatus according to claim 1, wherein the forced member has a sliding part that slides inside the insertion part.

3. The apparatus according to claim 2, wherein the forced member is the pad, and the pad comprises a film contacting part, the engagement mechanism and the sliding part.

4. The apparatus of claim 3, wherein the pad is integrally formed of synthetic resin.

5. The apparatus according to claim 2, wherein a face of the pad contacting the film defines a film contacting part, and a projected size of the engagement mechanism and a projected size of the sliding part are included within a projected size of the film contacting part when the film contacting part, the engagement mechanism, and the sliding part are projected onto the film.

6. The apparatus of claim 1, wherein the engagement mechanism is a hook that hooks the part of the holding mechanism.

7. The apparatus according to claim 1, wherein the engagement mechanism is a concave part that receives a protrusion on the holding mechanism, the protrusion being elastically deformable to engage the concave part when the forced member is inserted into the insertion part.

8. The apparatus according to claim 7, wherein the protrusion is adjacent the film path so that the protrusion is accessible from the film path.

9. The apparatus according to claim 1, wherein the engagement mechanism extends to the front side of the housing so that the engagement mechanism is accessible from the front side.

10. The apparatus according to claim 1, wherein the forced member is the magnetic head.

11. The apparatus according to claim 1, wherein the apparatus is a camera and the film path is defined by a film path forming structure including a camera body and a pressure plate.

12. A method for orienting a magnetic head in a camera, comprising the steps of:
    providing a camera having a film path formed within the camera where a film travels from a film cartridge spool to a film supply spool, the film path dividing the camera into a rear side and a front side of the camera;
    providing a magnetic head and a pad;
    forcing one member of the magnetic head and the pad to another one of the magnetic head and the pad using an elastic body, the one member being a forced member and the other member being a non-forced member;
    inserting the forced member from the rear side of the camera into an insertion part of a holding member;
    positioning the magnetic head adjacent the film path for reading or recording information on magnetic recording areas of the film;
    placing the pad to oppose the magnetic head across the film path to urge a magnetic recording area toward the magnetic head; and
    holding the forced member in the insertion part of the holding member to prevent the force of the elastic body from forcing the forced member out the insertion part and into the film path, wherein the holding step comprises preventing the forced member from escaping the insertion part by engaging a deformable engagement member on the forced member with a part of the holding member.

13. The method according to claim 12, wherein the forced member has a sliding part that slides inside the insertion part.

14. The method according to claim 13, wherein the forced member is the pad, the pad comprises a film contacting part, the engagement member and the sliding part.

15. The method according to claim 13, further comprising:
contacting a face of the pad on the film for defining a film contacting part; and
including a projected size of the engagement member and a projected size of the sliding part within a projected size of the film contacting part when the film contacting part, the film engagement member, and the sliding part are projected onto the film.

16. The method according to claim 12, wherein the engagement member is a hook that hooks the holding mechanism.

17. The method according to claim 12, wherein the engagement member is a concave section that engages a protrusion on the holding mechanism, the protrusion elastically deforming to engage the concave section when the forced member is inserted into the insertion unit from the rear side.

18. The method according to claim 17, wherein the protrusion is adjacent the film path so that the protrusion is accessible from the film path.

19. The method according to claim 12, wherein the engagement member is inserted into a hole formed in the holding mechanism and is rotatable between first and second positions, the first position permitting insertion into the hole and the second position preventing withdrawal from the hole.

20. An apparatus having a magnetic head comprising:
a housing having a film path formed within the housing so that a film moves in a lengthwise direction of the film, the film path dividing the housing into a rear side and a front side;
a magnetic head adjacent the film path that performs one of at least recording data in a magnetic recording area on the film and reading data from the magnetic recording area on the film;
contact means facing the magnetic head across the film path, the contact means urging the magnetic recording area toward the magnetic head;
elastic means forcing one member of the magnetic head and the contact means toward the other member of the magnetic head and the contact means, the one member being a forced member and the other member being a non-forced member; and
holding means that holds the forced member adjacent the film path against a force of the elastic means, the holding means comprising,
an insertion aperture adjacent the film path for receiving the forced member such that the forced member is insertable from the rear side to be held by the holding means, and
a receiving part that receives an end of the elastic means, wherein the forced member includes a deformable engagement means for engaging a part of the holding means so that the forced member is retained within the insertion aperture against the force from the elastic means.

21. The apparatus according to claim 20, wherein the forced member has a sliding part that slides inside the insertion aperture.

22. The apparatus according to claim 21, wherein the forced member is the contact means, and the contact means comprises a film contacting part, the engagement means and the sliding part.

23. The apparatus according to claim 22, wherein a face of the contact means contacting the film defines a film contacting part, and a projected size of the engagement means and a projected size of the sliding part are included within a projected size of the film contacting part when the film contacting part, the engagement means, and the sliding part are projected onto the film.

24. The apparatus of claim 20, wherein the engagement means is a hook that hooks the part of the holding means.

25. The apparatus according to claim 20, wherein the engagement means is a concave part that receives protrusion means on the holding means, the protrusion means being elastically deformable to engage the concave part when the forced member is inserted into the insertion aperture.

26. The apparatus according to claim 20, wherein the engagement means is inserted within a hole formed in the holding means and is rotatable between first and second positions, the first position permitting insertion within the hole and the second position preventing withdrawal from the hole.

27. An apparatus having a magnetic head comprising:
a housing having a film path formed within the housing so that a film moves in a lengthwise direction of the film, the film path dividing the housing into a rear side and a front side;
a magnetic head adjacent the film path that performs one of at least recording data in a magnetic recording area on the film and reading data from the magnetic recording area on the film;
a pad facing the magnetic head across the film path, the pad urging the magnetic recording area toward the magnetic head;
an elastic body forcing one member of the magnetic head and the pad toward the other member of the magnetic head and the pad, the one member being a forced member and the other member being a non-forced member; and
a holding mechanism that holds the forced member adjacent the film path against a force of the elastic body, the holding mechanism comprising,
an insertion part adjacent the film path for receiving the forced member such that the forced member is insertable from the rear side to be held by the holding mechanism, and
a receiving part that receives an end of the elastic body, wherein the forced member includes an engagement member, which is insertable within a hole formed in the holding mechanism, for engaging a part of the holding mechanism, wherein the engagement member is rotatable between first and second positions, the first position permitting insertion within the hole and the second position preventing withdrawal from the hole so that the forced member is retained within the insertion part against the force from the elastic body.

* * * * *